(12) United States Patent
Yoshida

(10) Patent No.: US 9,609,155 B2
(45) Date of Patent: Mar. 28, 2017

(54) IMAGE PROCESSING DEVICE, IMAGE PROCESSING METHOD, AND STORAGE MEDIUM STORING IMAGE PROCESSING PROGRAM

(71) Applicant: FUJIFILM Corporation, Tokyo (JP)

(72) Inventor: Masako Yoshida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/736,294

(22) Filed: Jun. 11, 2015

(65) Prior Publication Data

US 2015/0365547 A1 Dec. 17, 2015

(30) Foreign Application Priority Data

Jun. 16, 2014 (JP) .................................. 2014-123856

(51) Int. Cl.
*G06F 3/12* (2006.01)
*H04N 1/00* (2006.01)

(52) U.S. Cl.
CPC .......... *H04N 1/00456* (2013.01); *H04N 1/00* (2013.01); *H04N 2201/0082* (2013.01); *H04N 2201/0089* (2013.01)

(58) Field of Classification Search
None
See application file for complete search history.

(56) References Cited

U.S. PATENT DOCUMENTS

| 7,124,359 | B2 | 10/2006 | Suzuki et al. |
| 7,689,909 | B1 | 3/2010 | Szuszczewicz |
| 7,930,633 | B2 | 4/2011 | Suzuki et al. |
| 2003/0103234 | A1 | 6/2003 | Takabayashi et al. |
| 2003/0147097 | A1 | 8/2003 | Kotani et al. |
| 2004/0184069 | A1* | 9/2004 | Mifune ................... G06K 15/00 358/1.15 |
| 2005/0002061 | A1* | 1/2005 | Uchida .............. H04N 1/00222 358/1.18 |
| 2005/0117948 | A1* | 6/2005 | Hatta ................. H04N 1/00132 400/62 |

(Continued)

FOREIGN PATENT DOCUMENTS

| EP | 0784294 | 7/1997 |
| JP | 2003-231323 | 8/2003 |

(Continued)

OTHER PUBLICATIONS

Extended European search report, dated Oct. 27, 2015; Application No. 15172038.0.

(Continued)

*Primary Examiner* — Huo Long Chen
(74) *Attorney, Agent, or Firm* — Young & Thompson

(57) ABSTRACT

A print order reception apparatus displays one of an image selection screen and an editing content changing screen. In the image selection screen, a list display area for showing a plurality of thumbnail images and a finished print display area for showing target images, which are selected in the list display area, in a finished state are displayed side by side. In the editing content changing screen, the finished print display area and an editing command display area for showing edit buttons each for editing the target images are displayed side by side. A selection section selects and displays any one of the screens.

16 Claims, 12 Drawing Sheets

(56) References Cited

U.S. PATENT DOCUMENTS

| | | | |
|---|---|---|---|
| 2006/0072174 A1* | 4/2006 | Koike | H04N 1/3875 |
| | | | 358/537 |
| 2011/0012929 A1 | 1/2011 | Grosz et al. | |
| 2011/0099523 A1 | 4/2011 | van Zee et al. | |
| 2012/0069364 A1 | 3/2012 | Kodama | |
| 2012/0084717 A1* | 4/2012 | Yao | G06F 3/0481 |
| | | | 715/792 |

FOREIGN PATENT DOCUMENTS

| | | |
|---|---|---|
| JP | 2012110059 A | 6/2012 |
| JP | 2014085814 A | 5/2014 |

OTHER PUBLICATIONS

European Office Action dated Nov. 28, 2016 in corresponding European Patent Application No. 15172038.0.
Japanese Office Action dated Oct. 28, 2016; Application No. 2014-123856.

* cited by examiner

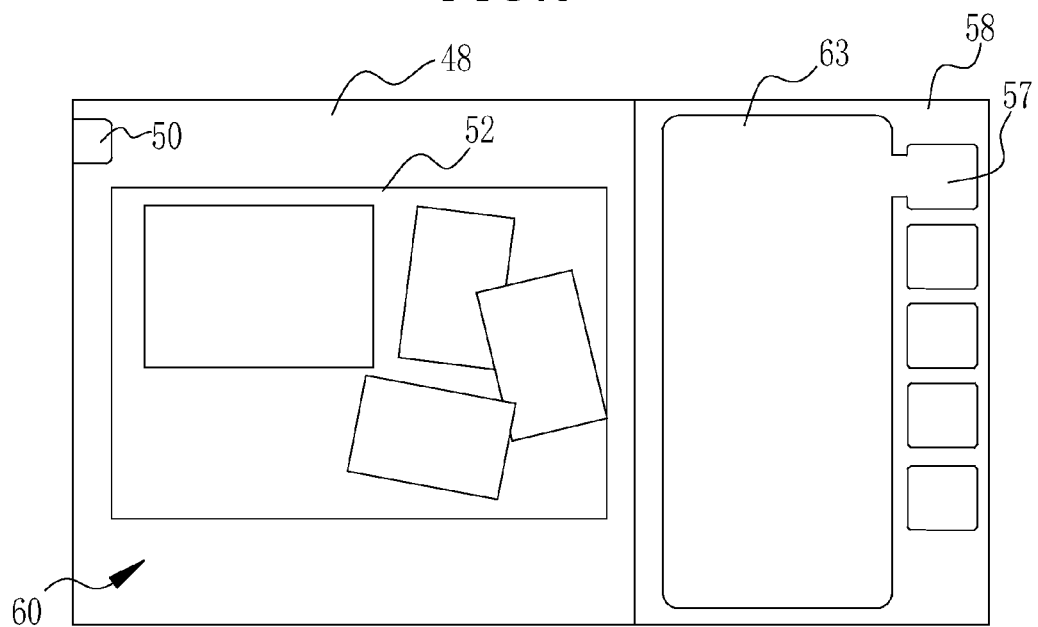
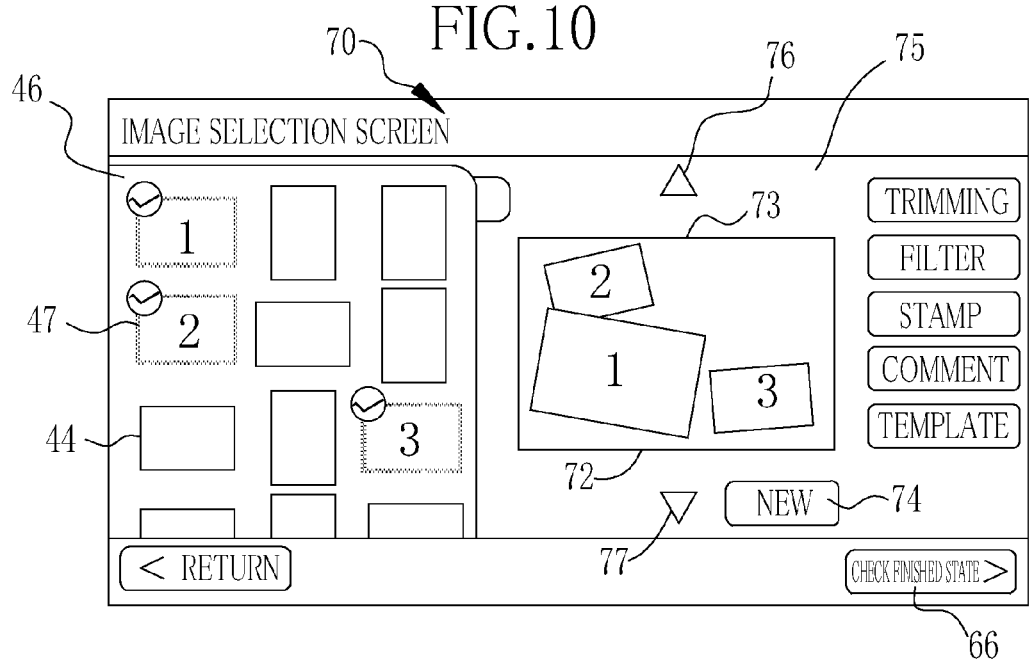

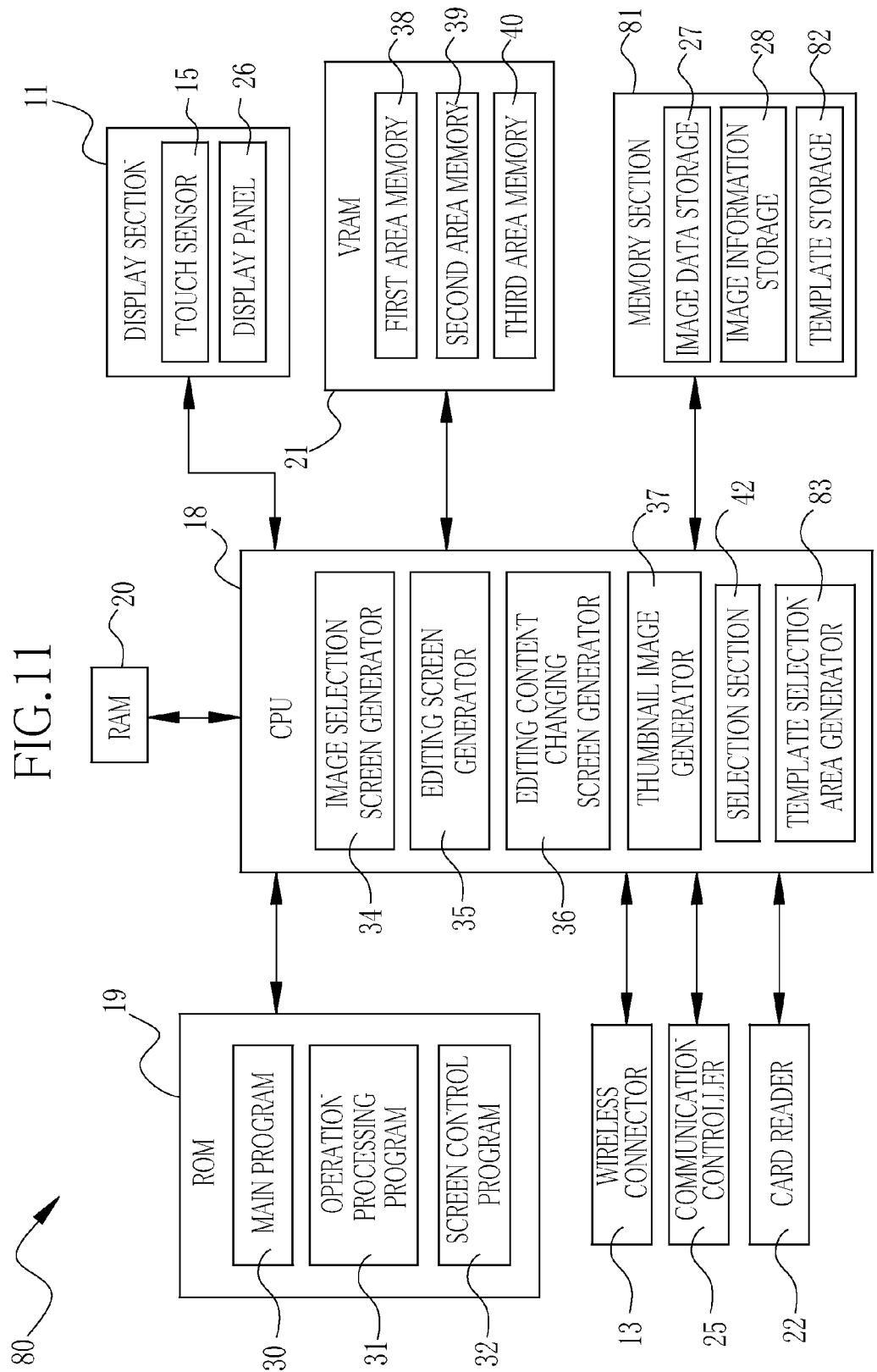

IMAGE PROCESSING DEVICE, IMAGE PROCESSING METHOD, AND STORAGE MEDIUM STORING IMAGE PROCESSING PROGRAM

CROSS-REFERENCE TO RELATED APPLICATIONS

The present application claims priority under 35 U.S.C. §119 to Japanese Patent Application No. 2014-123856, filed Jun. 16, 2014. The above application is hereby expressly incorporated by reference, in its entirety, into the present application.

BACKGROUND OF THE INVENTION

1. Field of the Invention

The present invention relates to an image processing device, an image processing method, and a storage medium storing an image processing program.

2. Description Related to the Prior Art

A print order reception apparatus, which is disposed at a shop such as a photo studio and a laboratory so as to receive a print order in accordance with an operation by a user, is known. The print order reception apparatus is connected to an input device such as a digital camera and a memory card, in which image data is stored, and loads the image data. The loaded image data is subjected to size reduction processing so as to be thumbnail images. A list of the thumbnail images is displayed on a display section of the print order reception apparatus. The print order reception apparatus receives a print order upon selection of desired thumbnail images to be printed from among the thumbnail images displayed in the list by a user.

Recently, in accordance with an increase in the kinds of input devices for inputting images and diversification in templates for defining arrangement position of images and in print setting such as an edit function, the number of setting items on an operation screen is increased. Therefore, it is necessary for a user to select a plurality of setting items for the purpose of ordering prints (see United States Patent Application Publication No. 2003/0147097 corresponding to Japanese Patent Laid-Open Publication No. 2003-231323).

Specifically, a first screen for displaying a list of loaded images is displayed, and after the images to be printed are selected on the first screen, a command indicating selection completion is inputted. Upon the input of the command, the first screen is switched to a second screen. An output destination for the printer, a paper size, the kind of paper, and the like are selected on the second screen. Thereafter, upon the input of the command indicating selection completion on the second screen, the second screen is switched to a third screen. On the third screen, a layout operation (an editing operation) and the like are performed. Thereby, according to the hierarchized setting screens, the currently-displayed screen is sequentially switched to another screen located at a lower hierarchical level.

However, there is a case where a user wants to return to a desired screen such as a list selection screen for selecting images to be printed (hereinafter referred to as target images) from among the images in the list, so as to replace the target images. In this case, a user has to choose one of an operation for returning to a screen located at a higher hierarchical level by successively manipulating a "return" button, for example, and an operation for returning to an initial screen so as to start selection of the target images again from the beginning by manipulating a "cancel(clear)" button, for example, to clear all the selected contents. Such operations are extremely bothersome. Consequently, it has been desired that a user can visually confirm a desired screen immediately.

SUMMARY OF THE INVENTION

An object of the present invention is to provide an image processing device, an image processing method, and a storage medium storing an image processing program, by which a user can visually confirm a desired screen readily and immediately.

An image processing device according to an aspect of the present invention includes a first screen generator, a second screen generator, and a selection section for selecting one of the first screen and the second screen. The first screen generator generates a first screen in which a list display area and a finished print display area are displayed side by side. The list display area displays a plurality of inputted images, and the finished print display area displays target images selected in the list display area in a finished state. The second screen generator generates a second screen in which the finished print display area and an editing command display area for displaying an editing command to edit the target images are displayed side by side. The first screen or the second screen selected by the selection section is displayed on a display section.

The image processing device further includes a template selection area generator for generating a template selection area for displaying different kinds of templates in the finished print display area. Each of the templates defines positions for arranging a plurality of the target images. The first screen generator and the second screen generator are configured to combine a plurality of the target images with the template and display the target images combined with the template in the finished print display area.

According to another aspect of the present invention, the image processing device further includes a third screen generator for generating a third screen in which the finished print display area, a balloon display area, and the editing command display area are displayed side by side. The balloon display area displays items contained in a lower hierarchical level of a designated editing command within a balloon. The selection section selects one of the first screen, the second screen, and the third screen.

It is preferable that the finished print display area in the second screen is larger than the finished print display area in the first screen or the third screen for the purpose of improving visibility of the finished print.

The selection section preferably includes a first operation section displayed in the second screen and the third screen so as to select the first screen, a second operation section displayed in the first screen so as to select the second screen, a third operation section displayed in the second screen so as to select the third screen, and a fourth operation section displayed in the third screen so as to select the second screen.

The image processing device further includes a template selection area generator for generating a template selection area for displaying different kinds of templates in the finished print display area. Each of the templates defines positions for arranging a plurality of the target images. The first screen generator, the second screen generator, and the third screen generator are configured to combine a plurality of the target images with the template and display the target images combined with the template in the finished print display area.

The image processing device further includes an order section for making an order for printing the target images displayed in a finished state in the finished print display area.

An image processing method according to an aspect of the present invention includes a first screen generating step, a second screen generating step, a selection step, and a displaying step. The first screen generating step generates a first screen in which a list display area and a finished print display area are displayed side by side. The list display area displays a plurality of inputted images, and the finished print display area displays target images selected in the list display area in a finished state. The second screen generating step generates a second screen in which the finished print display area and an editing command display area for displaying an editing command to edit the target images are displayed side by side. The selection step selects one of the first screen and the second screen. The displaying step displays the first screen or the second screen selected by the selection step.

According to the image processing method of the present invention, since one of the different kinds of templates each for defining positions for arranging a plurality of the target images is selected in the finished print display area, and the first screen generating step and the second screen generating step are configured to combine a plurality of the target images with the template and display the target images combined with the template in the finished print display area, it is advantageously unnecessary to return to the previous screen.

According to another aspect of the present invention, the image processing method further includes a third screen generating step for generating a third screen in which the finished print display area, a balloon display area, and the editing command display area are displayed side by side. The balloon display area displays items contained in a lower hierarchical level of a designated editing command within a balloon. The selection step selects one of the first screen, the second screen, and the third screen.

According to the image processing method of the present invention, since one of the different kinds of templates each for defining positions for arranging a plurality of the target images is selected in the finished print display area, and the first to third screen generating steps are configured to combine a plurality of the target images with the template and display the target images combined with the template in the finished print display area, it is advantageously unnecessary to return to the previous screen.

An image processing program stored in a storage medium in a computer-readable manner according to an aspect of the present invention makes a computer execute a first screen generating step, a second screen generating step, a selection step, and a displaying step. The first screen generating step generates a first screen in which a list display area for displaying a plurality of inputted images and a finished print display area for displaying target images selected in the list display area in a finished state are displayed side by side. The second screen generating step generates a second screen in which the finished print display area and an editing command display area for displaying an editing command to edit the target images are displayed side by side. The selection step selects one of the first screen and the second screen. The displaying step displays the first screen or the second screen selected by the selection step.

According to another aspect of the present invention, the image processing program stored in the storage medium further makes the computer execute a third screen generating step for generating a third screen in which the finished print display area, a balloon display area, and the editing command display area are displayed side by side. The balloon display area displays items contained in a lower hierarchical level of a designated editing command within a balloon. The selection step selects one of the first screen, the second screen, and the third screen.

Consequently, according to the present invention, a user can visually confirm a desired screen immediately.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 9 is an explanatory view of the editing content changing screen of FIG. 7;

FIG. 10 is an explanatory view of an editing screen provided with an order addition function in a finished print display area;

FIG. 11 is a block diagram schematically illustrating an electrical configuration of FIG. 10;

DESCRIPTION OF THE PREFERRED EMBODIMENTS

Figure 1:
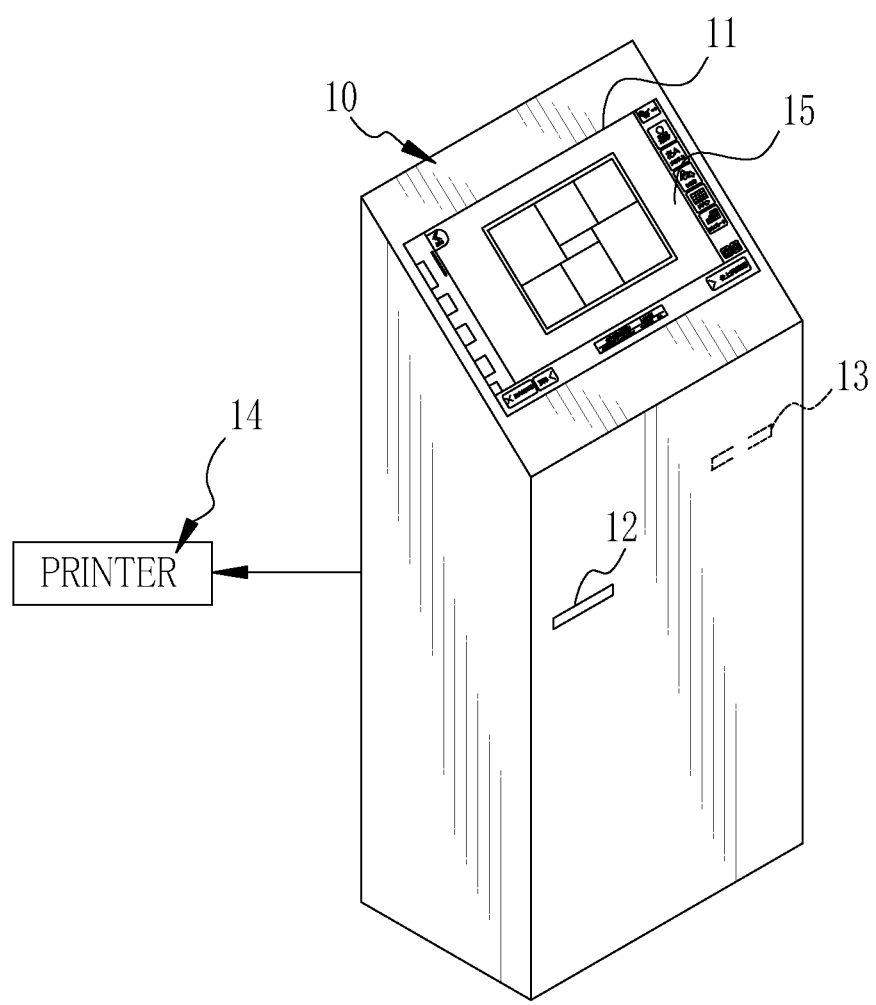
FIG. 1 is a perspective view illustrating a print order reception apparatus.

FIG. 1 shows a print order reception apparatus 10 according to an embodiment of the present invention. As shown in FIG. 1, the print order reception apparatus 10 includes a display section 11, a slot 12, a wireless connector 13. Additionally, a printer 14 is externally connected to the print order reception apparatus 10. The display section 11 has a touch sensor 15. For example, a memory card in which image data and the like are stored is connected to the slot 12. For example, a mobile phone or a personal digital assistance is wirelessly connected to the wireless connector 13. The print order reception apparatus 10 loads image data from a device connected thereto. The loaded image data is subjected to size reduction processing so as to be thumbnail images. A list of the thumbnail images is displayed on the display section 11. A user creates order information by performing an input operation while viewing an order screen on which the list of the thumbnail images is displayed.

The printer 14 loads the image data and the order information containing customer identification data from the print order reception apparatus 10, and performs printing processing corresponding to the order information. At a shop, the customer receives printed photographs and pays printing fees.

Although the print order reception apparatus 10 is connected one by one to the printer 14 in FIG. 1, a plurality of the print order reception apparatuses 10 may be connected to the printer 14. Further, in the case where the printer 14 to be connected to the print order reception apparatus 10 is disposed in a remote location, the printer 14 and the print order reception apparatus 10 may be connected to each other using LAN (Local Area Network) or Internet. Furthermore, an input section including a mouse, a keyboard, or the like may be provided to the print order reception apparatus 10 so as to create the order information by manipulation of the input section.

Figure 2:
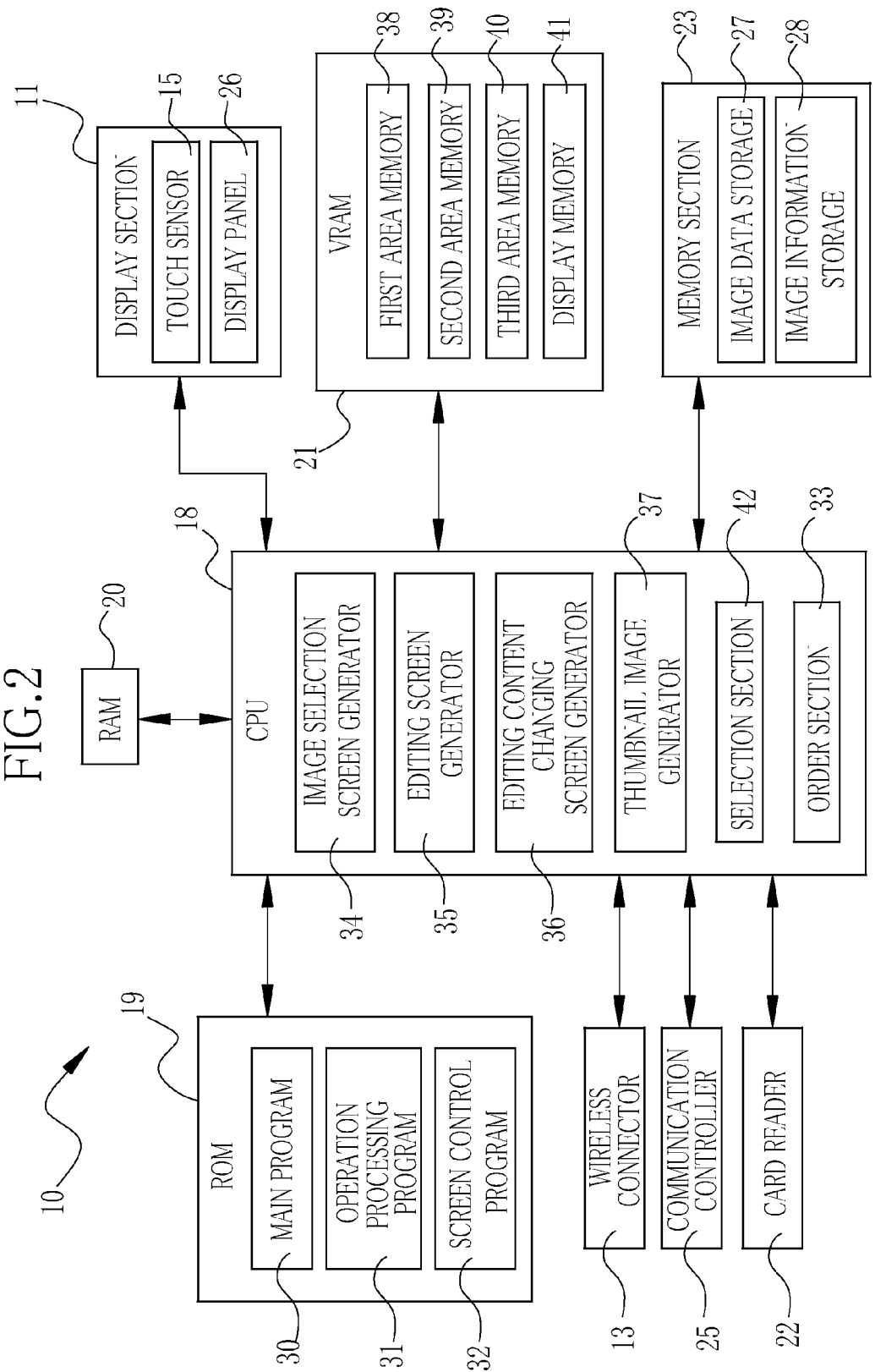
FIG. 2 is a block diagram illustrating an electrical configuration of the print order reception apparatus.

FIG. 2 shows an electrical configuration of the print order reception apparatus 10. As shown in FIG. 2, the print order reception apparatus 10 includes a CPU (Central Processing Unit) 18, the display section 11, a ROM (read only memory) 19, a RAM (Random Access Memory) 20, a VRAM (Video RAM) 21, a card reader 22, a memory section 23, a wireless connector 13, and a communication controller 25. The CPU 18, the ROM 19, and the RAM 20 function as an image processing device.

The display section 11 includes a touch sensor 15 and a display panel 26. The order screen for creating the order information is displayed on the display panel 26. A customer creates order information by performing an input operation in accordance with a procedure shown on the order screen. The card reader 22 is provided in the slot 12 so as to load the image data stored in the memory card, for example.

The memory section 23 includes an image data storage 27 for storing the loaded image data. Additionally, the memory section 23 includes an image information storage 28 for storing image information containing data of component images to be used for generating the order screen, and the like. The image information contains image data for animation images to be displayed on the order screen, and the like. Further, the memory section 23 stores information such as data of templates necessary for creating the order information, and a program and data necessary for editing processing.

The communication controller 25 is used to send/receive the data to/from the printer 14. The communication controller 25 is a LAN card or the like, for example. The communication controller 25 is connected to the printer 14 corresponding to printer identification information set preliminarily, and sends the order information and the image data to the printer 14 connected to the communication controller 25. Incidentally, the printer identification information is stored in the memory section 23.

A main program 30, an operation processing program 31, a screen control program 32, and the like are written in the ROM 19. At first, the main program 30 is executed by the CPU 18 so as to create the order information. The operation processing program 31 is used such that a touch position inputted from the input section such as the touch sensor 15 and input information corresponding to a type of the touch operation match the information to be processed by the CPU 18. The screen control program 32 is used to control a screen to be shifted based on the input information. The RAM 20 is a working memory for the CPU 18 or the like to execute various kinds of programs.

The CPU 18 executes the main program 30 so as to generate the order screen and create the order information based on the input information. The order screen has an image selection screen for displaying the list of the images, an editing screen for displaying editing commands, and an editing content changing screen for displaying items contained in a lower hierarchical level of each of the editing commands. The CPU 18 includes an image selection screen generator 34 for generating the image selection screen, an editing screen generator 35 for generating the editing screen, and an editing content changing screen generator 36 for generating the editing content changing screen.

Additionally, the CPU 18 includes a thumbnail image generator 37, a selection section 42, and an order section 33. The thumbnail image generator 37 generates thumbnail images 44 (see FIG. 3) by subjecting the loaded images to the size reduction processing. The selection section 42 selects one of the image selection screen, the editing screen, and the editing content changing screen based on the input information. The order section 33 creates the order information based on the input information.

Incidentally, the image selection screen is one example of a first screen, and the image selection screen generator 34 is one example of a first screen generator. The editing screen is one example of a second screen, and the editing screen generator 35 is one example of a second screen generator. The editing content changing screen is one example of a third screen, and the editing content changing screen generator 36 is one example of a third screen generator.

The VRAM 21 is a memory dedicated for displaying the order screen and the like on the display section 11. The VRAM 21 includes a first area memory 38, a second area memory 39, a third area memory 40, and a display memory 41. The order screen has three areas each having a different display content. For example, the three areas are a list display area, a finished print display area, and an editing command display area.

The first to third memories 38 to 40 are memories used to generate images to be displayed in the three areas. The first area memory 38 is used to generate an image in the list display area. The second area memory 39 is used to generate an image in the finished print display area. The third area memory 40 is used to generate an image in the editing command display area and a balloon display area to be described in detail later.

In the display memory 41, the images in the first to third area memories 38 to 40 are combined so as to generate the screen selected by the selection section 42. The order screen obtained by combining the images in the display memory 41 is outputted to the display panel 26.

Figure 3:
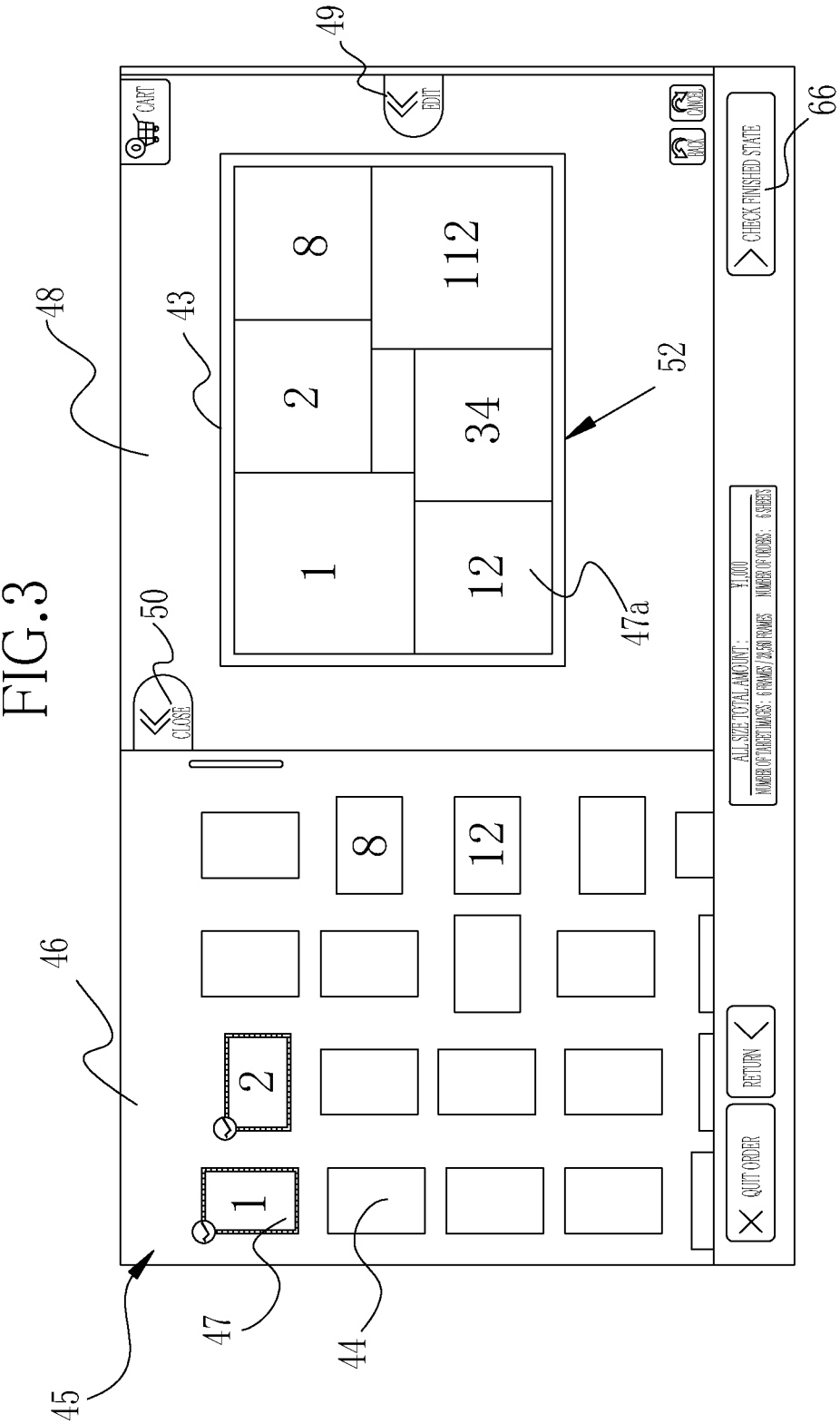
FIG. 3 is an explanatory view of an image selection screen.

FIG. 3 illustrates an image selection screen 45. As shown in FIG. 3, a list display area 46 for showing the inputted thumbnail images 44 and a finished print display area 48 are displayed side by side in the image selection screen 45. The finished print display area 48 displays a print target image 47a, which is the same as the target image 47 selected from among a plurality of the thumbnail images 44 displayed in the list display area 46, in a finished state. The print target image 47a in the finished state is equivalent to an image obtained by printing the target image 47 by the printer 14. Specifically, in addition to the appearance of the target image 47, the position, the size, the range, and the like of the target image 47 relative to the whole print (i.e., sheet) are the same as those of the print target image 47a. The thumbnail images 44 are one example of plural inputted images.

Further, a button for shifting to the editing screen, e.g., an edit button 49 is displayed in the image selection screen 45. Furthermore, another button for shifting to the editing screen, e.g., a close button 50 is displayed in the image selection screen 45. The print target image 47a, which is displayed in the finished print display area 48, is displayed as a finished print 52 obtained by being combined with a template 43, for example. The template 43 is a form for defining arrangement (i.e., layout) of the print target images 47a. One or plural print target images 47a are selected in accordance with the template 43. Incidentally, the edit button 49 or the close button 50 are one example of a second operation section.

Note that, in FIG. 3, in the case where all the thumbnail images 44 cannot fit in one page, the list display area 46 is scrolled in a vertical direction. Further, the number shown in the target image 47 in the list display area 46 and the number shown in the print target image 47a in the finished print display area 48 represent the order of loading of plural inputted images, for example. In this embodiment, the target image 47 selected in the list display area 46 is combined with a frame having the same number as that of the target image 47 within the template 43.

Figure 4:
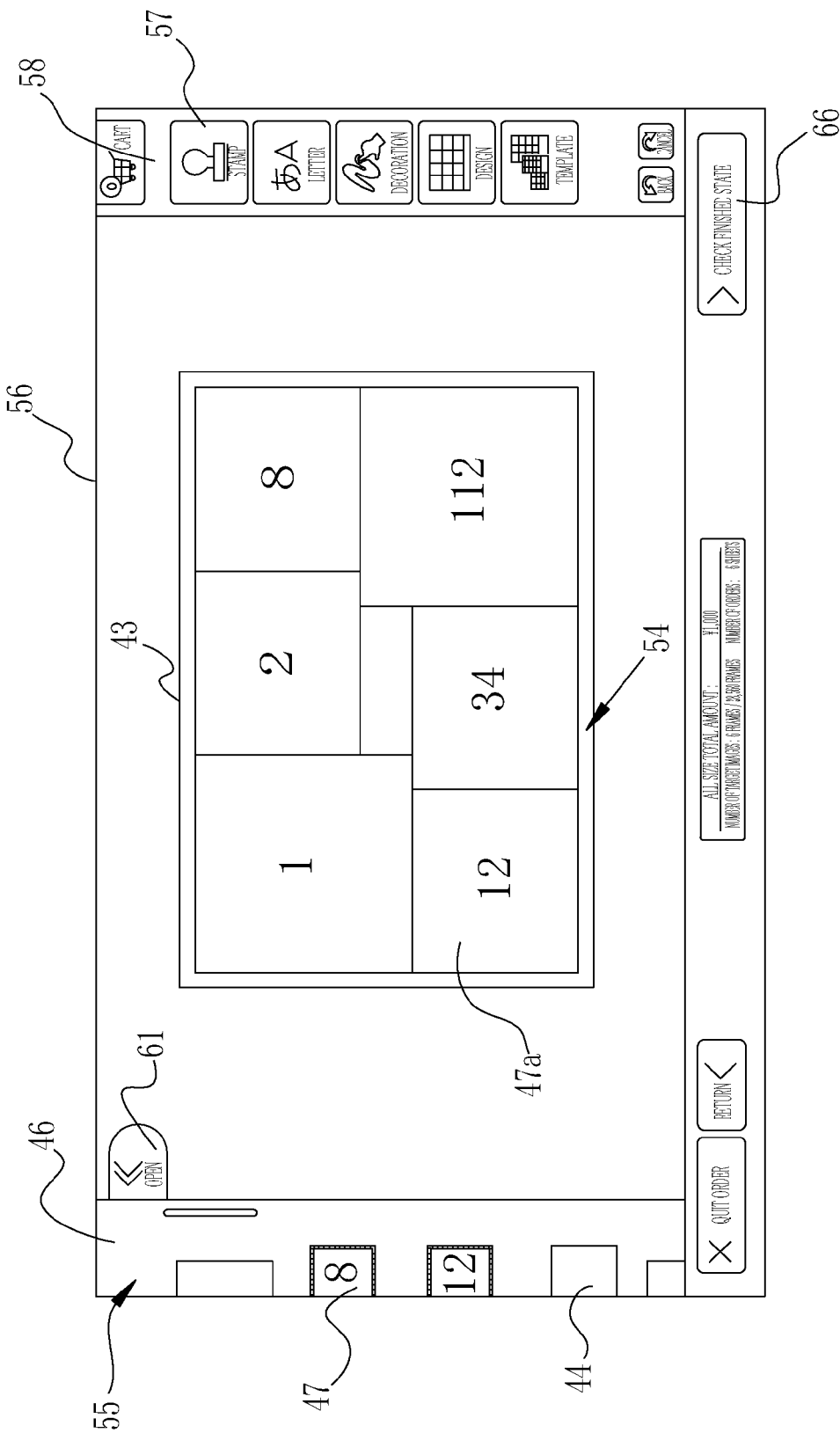
FIG. 4 is an explanatory view of an editing screen.

FIG. 4 shows an editing screen 55. As shown in FIG. 4, part of the list display area 46, a finished print display area 56, and an editing command display area 58 are displayed side by side in the editing screen 55. Incidentally, part of the list display area 46 may be omitted. The finished print display area 56 is displayed in an enlarged manner so as to have a size larger than that of each of the image selection screen 45 and the finished print display area 48 in an editing content changing screen 60 to be described in detail later. A plurality of edit buttons 57 each indicating a command for editing the print target image 47a (also referred to as editing command buttons) are arranged in the editing command display area 58. Each of the edit buttons 57 displayed in the editing screen 55 also functions as a button for shifting to the editing content changing screen 60. Further, a button for shifting to the image selection screen 45, e.g., an open button 61 is displayed in the editing screen 55. Incidentally, the open button 61 is one example of a first operation section, and the edit button 57 is one example of a third operation section.

Figure 5:
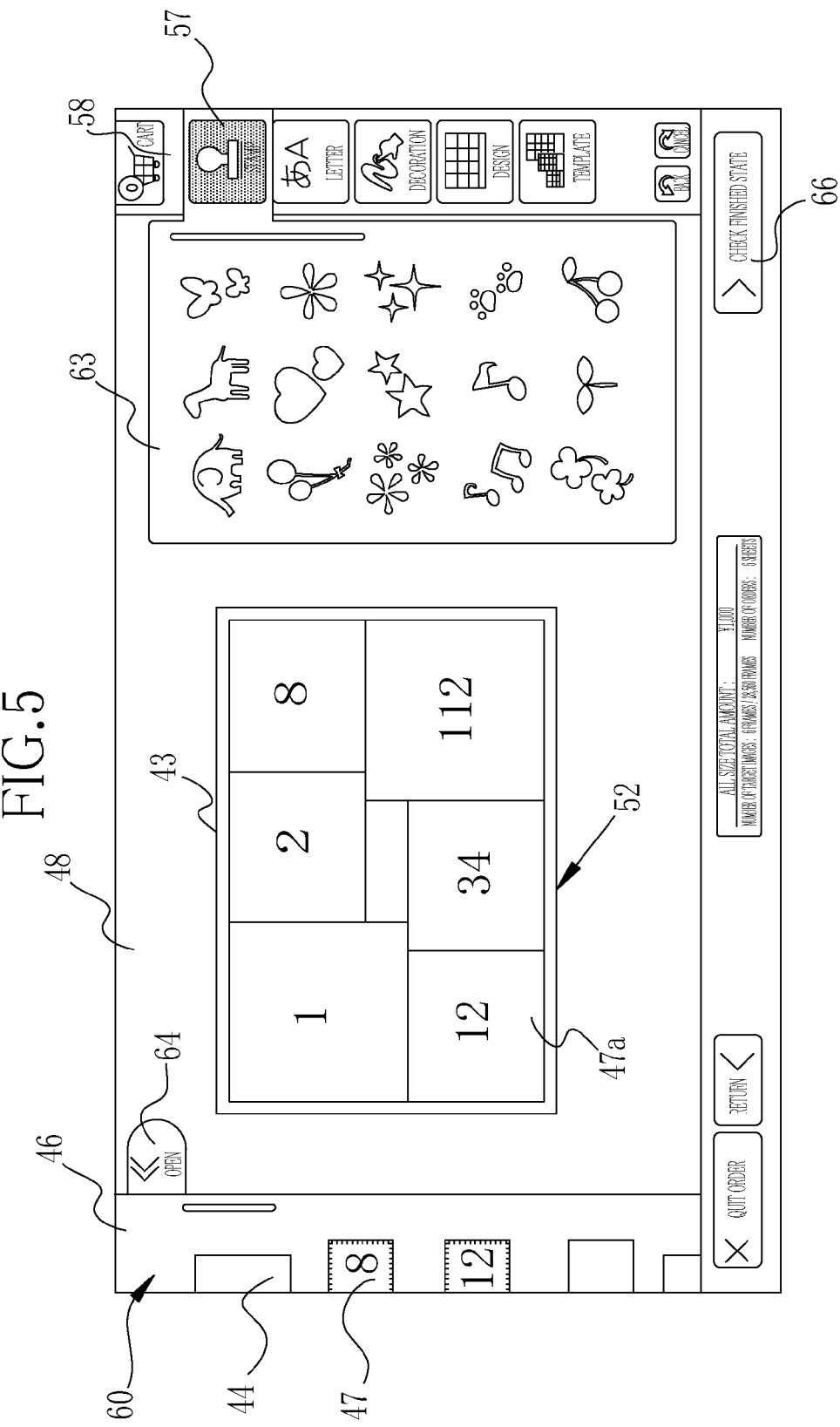
FIG. 5 is an explanatory view of an editing content changing screen.

FIG. 5 shows the editing content changing screen 60. As shown in FIG. 5, the finished print display area 48, a balloon display area 63 in which items contained in a lower hierarchical level of the designated editing button 57 are displayed within a balloon, and the editing command display area 58 are displayed side by side in the editing content changing screen 60. The finished print display area 48 in the editing content changing screen 60 is smaller than the finished print display area 56 in the editing screen 55. Each of the edit buttons 57 displayed in the editing content changing screen 60 also functions as a button for shifting to the editing screen 55. Further, a button for shifting to the image selection screen 45, e.g., an open button 64 is displayed in the editing content changing screen 60. Incidentally, the open button 64 is one example of the first operation section, and the edit button 57 in the editing content changing screen 60 is one example of a fourth operation section.

Figure 6:
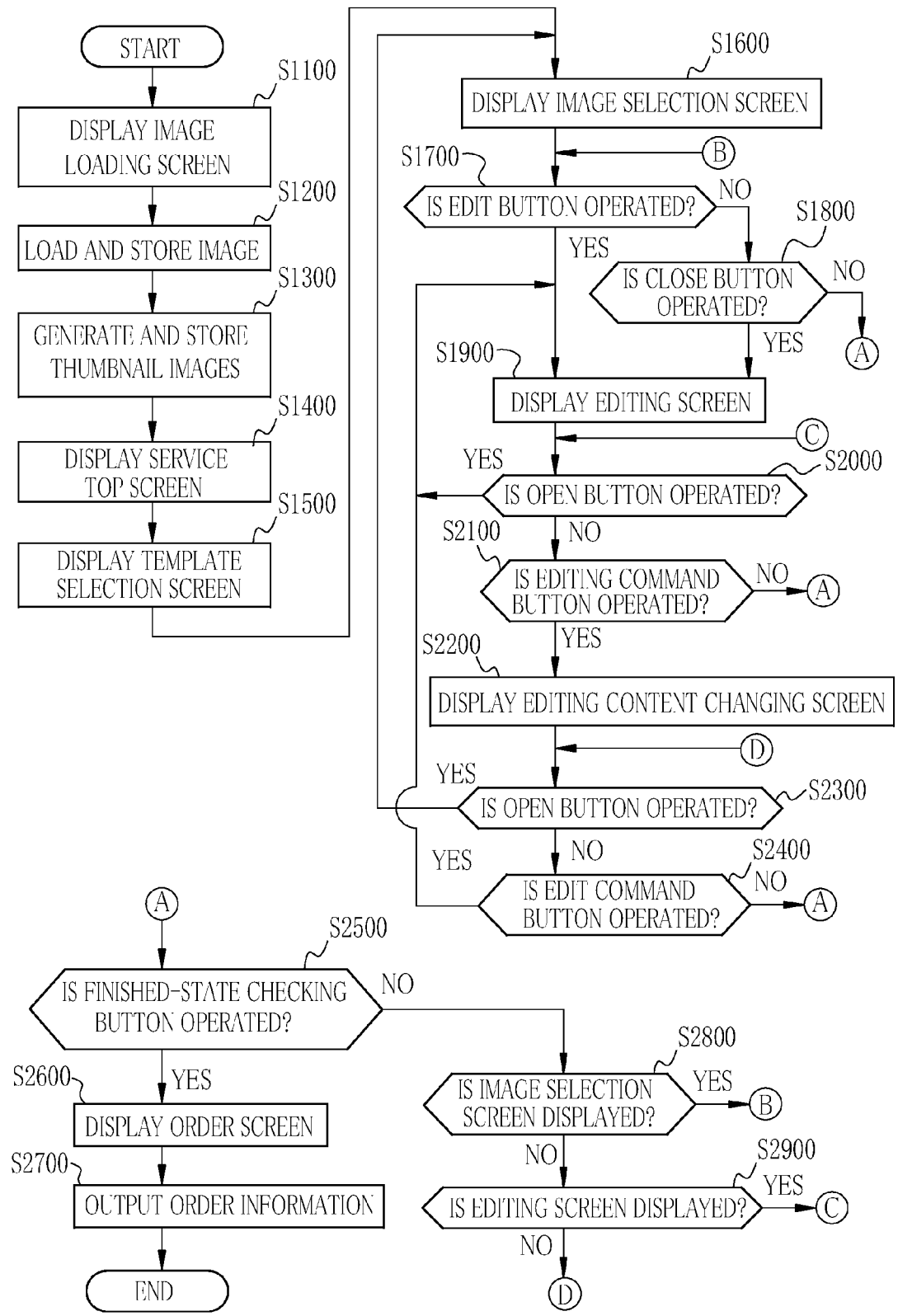
FIG. 6 is a flow chart of a procedure for making an order for printing.

FIG. 6 shows a procedure for operating the order screen. Upon activation of the print order reception apparatus 10, firstly, an image loading screen is displayed on the display section 11 (step S1100). An access point is designated on the image loading screen, and an operation for loading image data from a memory card connected thereto, for example, is performed. The loaded image data is stored in the image data storage 27 (step S1200). After the loading of the image data, the thumbnail image generator 37 generates thumbnail images by subjecting the image data to the size reduction processing. The generated thumbnail images are stored in the memory section 23 (step S1300).

During or after the loading of the image data, the image loading screen is shifted to a service top screen (step S1400). On the service top screen, one of the items designating a print type, such as "one sheet print", "postcard", and "photobook", is selected by a touch operation.

Upon completion of the selection of the print type on the service top screen, a template selection screen is displayed (step S1500). A plurality of different kinds of templates are displayed in the template selection screen. Upon selection of one of the templates by a touch operation, the template selection screen is shifted to the image selection screen 45 (step S1600).

As described in detail in the explanation regarding FIG. 3, the list display area 46 and the finished print display area 48 are displayed side by side in a horizontal direction in the image selection screen 45. The thumbnail images 44 stored in the memory section 23 are arranged in two dimensions, for example, in the list display area 46. In the case where all the thumbnail images 44 cannot fit in one screen, the list display area 46 is generated as an area capable of being scrolled in a vertical direction, for example. The thumbnail image 44 to be printed is selected by a touch operation in the list display area 46. The target image 47 is highlighted. Specifically, the color of a contour of the target image 47 is changed, for example.

The finished print 52, which is obtained by combing the print target images 47a with the template 43 selected in the template selection screen, is displayed in the finished print display area 48. The template 43 is intended for six frames, for example, and the six target images 47 selected in the list display area 46 are arranged on one-by-one basis in the frames of the template 43.

The finished state of the print can be imagined by visually confirming the finished print 52 displayed in the finished print display area 48. Further, it is possible to change the target images 47 in the list display area 46 so as to obtain a desired print while viewing the finished print 52.

Upon touching the edit button 49 (i.e., YES in step S1700) or the close button 50 (i.e., YES in step S1800) on the image selection screen 45, the image selection screen 45 is switched to the editing screen 55 (step S1900). Concurrently, there is displayed an animation image, in which the list display area 46 is pushed out to the left and reduced in size, and instead, the finished print display area 48 is drawn to the left, enlarged, and changed into the finished print display area 56 in an enlarged state. Since the finished print 54 is also enlarged in accordance with the enlargement of the finished print display area 56 in the editing screen 55, the visibility of the finished state of the print is improved.

Upon touching the open button 61 in the editing screen 55 (i.e., YES in step S2000), the editing screen 55 is switched to the image selection screen 45 (step S1600). Concurrently, there is displayed an animation image, in which the list display area 46 is drawn from the left and enlarged, and instead, the finished print display area 56 is reduced in size and changed into the finished print display area 48 in a reduced-size state.

Upon touching a predetermined edit button 57 indicating a command "stamp", for example, among the plural edit buttons 57 on the editing screen 55 (i.e., YES in step S2100), the editing content changing screen 60 is displayed (step S2200). Upon switching to the editing content changing screen 60, there is displayed an animation image, in which the balloon display area 63 for displaying the items contained in a lower hierarchical level of the selected edit button 57 indicating the command "stamp" within a balloon is drawn to the left and enlarged, and instead, the finished print display area 56 in the enlarged state is changed into the finished print display area 48 in the reduced-size state. Incidentally, at the left side of each of the editing content changing screen 60 and the editing screen 55, part of the list display area 46 is displayed. Therefore, it is possible to visually confirm the position of the list display area 46.

The size of the balloon to be displayed within the balloon display area 63 is determined in accordance with the number of the items contained in the lower hierarchical level of the edit button 57. In the case where all the items contained in the lower hierarchical level of the edit button 57 cannot fit in the balloon, the balloon display area 63 is scrolled in a vertical direction, for example, such that invisible items are displayed.

Upon touching the open button 64 in the editing content changing screen 60 (i.e., YES in step S2300), the image selection screen 45 is displayed again (step S1600). Concurrently, there is displayed an animation image, in which the list display area 46 is drawn to the right, moved, and enlarged, and in accordance with this, the finished print display area 48 is moved to the right, and instead, the balloon display area 63 is pushed out to the right and disappears together with the editing command display area 58.

Further, upon touching the selected edit button 57 indicating the command "stamp" on the editing content changing screen 60 (i.e., YES in step S2400), the editing screen 55 is displayed again (step S1900). Concurrently, there is displayed an animation image, in which the balloon display area 63 is pushed out to the right and reduced in size while the editing command display area 58 remains as it is, and instead, the finished print display area 48 in the reduced-size state is drawn to the right and enlarged so as to be changed into the finished print display area 56 in the enlarged state.

As the animation images are displayed as described above, not only the shifting of the images, but also the dynamic change, in which each of the list display area 46, the finished print display areas 48 and 56, and the balloon display area 63 is slid to the left and right, for example, can be visually confirmed. Thereby, it becomes possible to perceive the opening/closing direction (i.e., drawing direction) of the list display area 46, the finished print display areas 48 and 56, and the balloon display area 63 in an intuitive manner.

Further, upon selection of the editing screen 55, the finished print display area 56 is displayed in an enlarged manner relative to each of the image selection screen 45 and the editing content changing screen 60. Furthermore, upon selection of the image selection screen 45, the list display area 46 is displayed in an enlarged manner relative to the editing screen 55. Further, upon selection of the editing content changing screen 60, the editing command display area 58 is displayed in an enlarged manner relative to the editing screen 55 due to the size of the balloon display area 63. As described above, in accordance with the selected screen, the size of the area occupying the screen becomes larger, and therefore the visibility of the target area is improved. As a result, the operation can be readily performed.

At the lower right portion of each of the image selection screen 45, the editing screen 55, and the editing content changing screen 60, a button for proceeding to the next screen, for example, a finished-state checking button 66 is displayed. Upon touching the finished-state checking button 66 in the image selection screen 45, for example (i.e., YES in step S2500), the image selection screen 45 is switched to the order screen (step S2600). Upon touching an order button after setting the desired number of the prints on the order screen, the order information is created, and the order information and the image data linked to the order information are outputted to the printer 14 (step S2700).

Since the finished print display area 48 or 56 is displayed in any one of the image selection screen 45, the editing screen 55, and the editing content changing screen 60 as described above, the finished state can be visually confirmed immediately, and the operation can be efficiently performed. Further, unlike the conventional manner, it is unnecessary to switch the screens so as to check the finished print display area, and as a result, the speeding-up of the operation can be achieved. The magnification/reduction ratio of each of the finished print display areas 48 and 56 at the time of switching to the editing screen 55 is lower than the magnification/reduction ratio of each of the list display area 46 and the balloon display area 63. Therefore, it is possible to decrease the user's eye movement toward the finished print display areas 48 and 56 as much as possible. As a result, it is possible to prevent strain on eyes of the user.

Although switching among three screens, i.e., the image selection screen 45, the editing screen 55, and the editing content changing screen 60 is performed in each of the above embodiments, it is also possible to adopt a configuration in which the editing screen 55 is omitted and switching is performed between the image selection screen 45 and the editing content changing screen 60.

Figure 7:
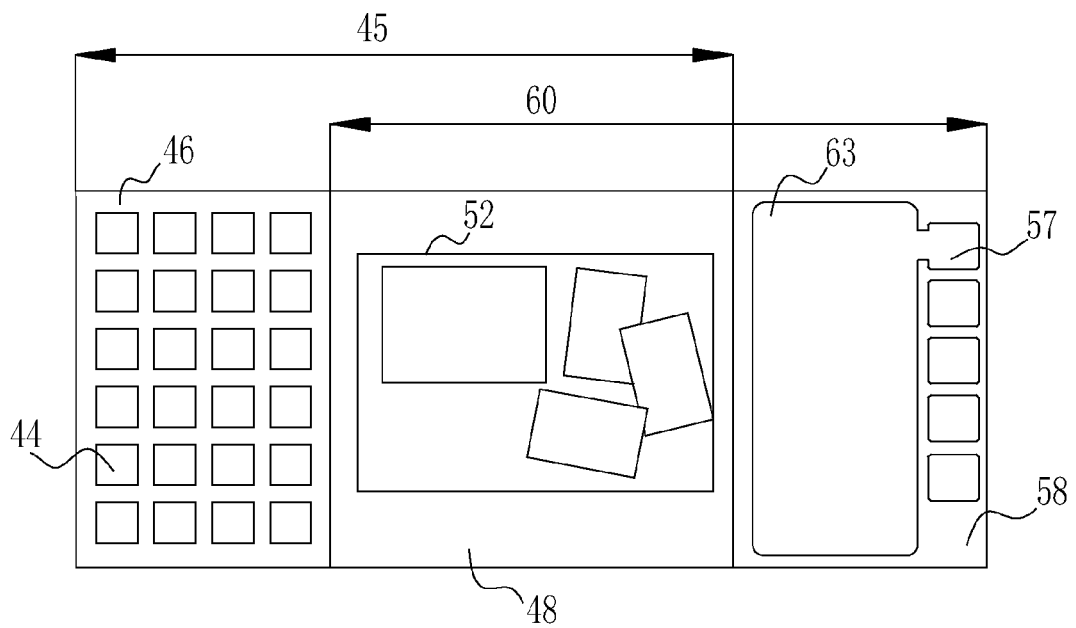
FIG. 7 is an explanatory view of an embodiment in which two screens including the image selection screen and the editing content changing screen are displayed.

FIG. 7 shows an embodiment in which the editing screen 55 is omitted and switching between the image selection screen 45 and the editing content changing screen 60 is performed such that one of them is displayed. Incidentally, in FIG. 7, both the image selection screen 45 and the editing content changing screen 60 are shown for the purpose of making the positional relationship of them clear. As shown in FIG. 7, each of the image selection screen 45 and the editing content changing screen 60 has the finished print display area 48 in common.

Figure 8:
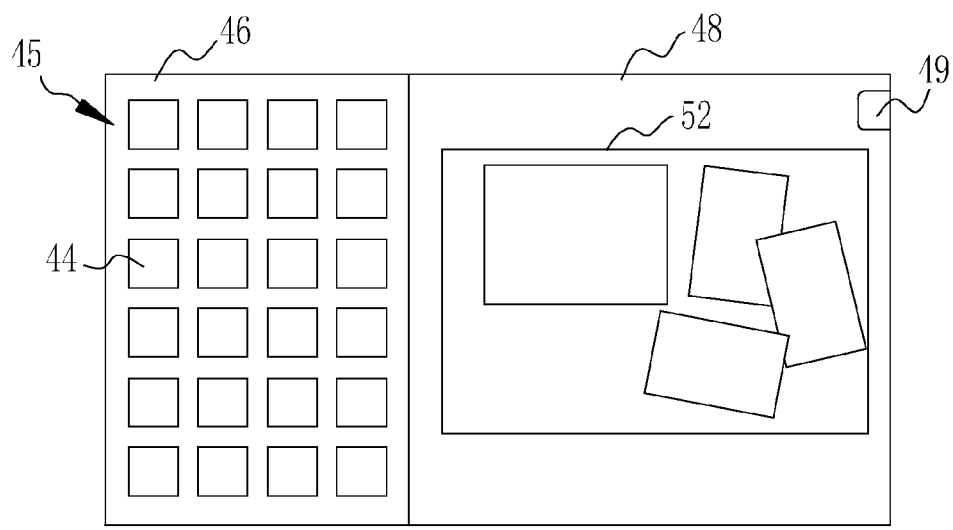
FIG. 8 is an explanatory view of the image selection screen of FIG. 7.

FIG. 8 shows the image selection screen 45 of FIG. 7. As shown in FIG. 8, the list display area 46 for showing the plural inputted thumbnail images 44 and the finished print display area 48 for showing the target images selected in the list display area 46 in a finished state are displayed side by side in the image selection screen 45. The image selection screen 45 is one example of the first screen.

FIG. 9 shows the editing content changing screen 60 of FIG. 7. As shown in FIG. 9, the finished print display area 48, the editing command display area 58 for showing the commands of the edit buttons 57 to edit the target image, and the balloon display area 63 in which the items contained in a lower hierarchical level of the designated editing button 57 are shown within the balloon are displayed side by side in the editing content changing screen 60. Incidentally, the editing content changing screen 60 is one example of the second screen. In this embodiment, the size of each of the finished print display area 48 and the finished print 52 displayed in the image selection screen 45 is the same as that displayed in the editing content changing screen 60.

Note that, the edit button 49 shown in FIG. 8 is used to select and display the editing content changing screen 60, and is one example of the selection section. The close button 50 shown in FIG. 9 is used to select and display the image selection screen 45, and is one example of the selection section.

FIG. 10 shows an embodiment in which an image selection screen 70 is provided with a function of adding an order for printing (hereinafter referred to as order addition function). As shown in FIG. 10, a first template 72 selected at first is displayed in a finished print display area 75, and a plurality of the target images 47 are selected from the list display area 46 in the image selection screen 70. A first finished print 73 obtained by combining the target images 47 with the first template 72 is displayed in the finished print display area 75. The image selection screen generator 34 generates an order addition button, for example, a "NEW" button 74 in the finished print display area 75. Upon touching the "NEW" button 74, the information regarding the first finished print 73 currently displayed in the finished print display area 75, including the kind of the template 72, the target images 47, and the positions of the target images 47 combined with the template 72, for example, is stored.

The image selection screen generator 34 displays a triangular button 76 at the upper portion of the finished print display area 75, and a triangular button 77 at the lower portion thereof, so as to generate the finished print display area 75 capable of being scrolled in a direction indicated by the triangular buttons 76 and 77, for example, in a vertical direction. Upon touching the triangular buttons 76 and 77 in the finished print display area 75, the currently-displayed template 72 is scrolled and switched to another template.

Note that, the scrolling direction of the finished print display area 75 is preferably set to a direction different from the moving direction (drawing direction) toward the image selection screen 70. The preferable scrolling direction of the finished print display area 75 is a direction perpendicular to the moving direction. Further, in the case where another template is newly selected without manipulating the "NEW" button 74, for example, the template selected currently is switched to the newly-selected template in the finished print display area 75.

FIG. 11 shows an electrical configuration of a print order reception apparatus 80 in the embodiment shown in FIG. 10. As shown in FIG. 11, the CPU 18 includes a template selection area generator 83 for displaying different kinds of templates in the finished print display area 75. The kinds of templates are stored in a memory section 81.

Additionally, the memory section 81 includes a template storage 82 for storing information of the finished print 73 displayed in the finished print display area 75. The template storage 82 stores the information of the finished print 73 in accordance with a manipulation of the "NEW" button 74. The information regarding the finished print 73 contains information such as the kind of template 72 currently displayed in the finished print display area 75, the selected target images 47, and the arrangement (i.e., positions) of the target images 47. Note that, in FIG. 11, the same components as those in FIG. 3 are denoted by the same reference numerals, and the explanation thereof will be omitted.

Figure 12:
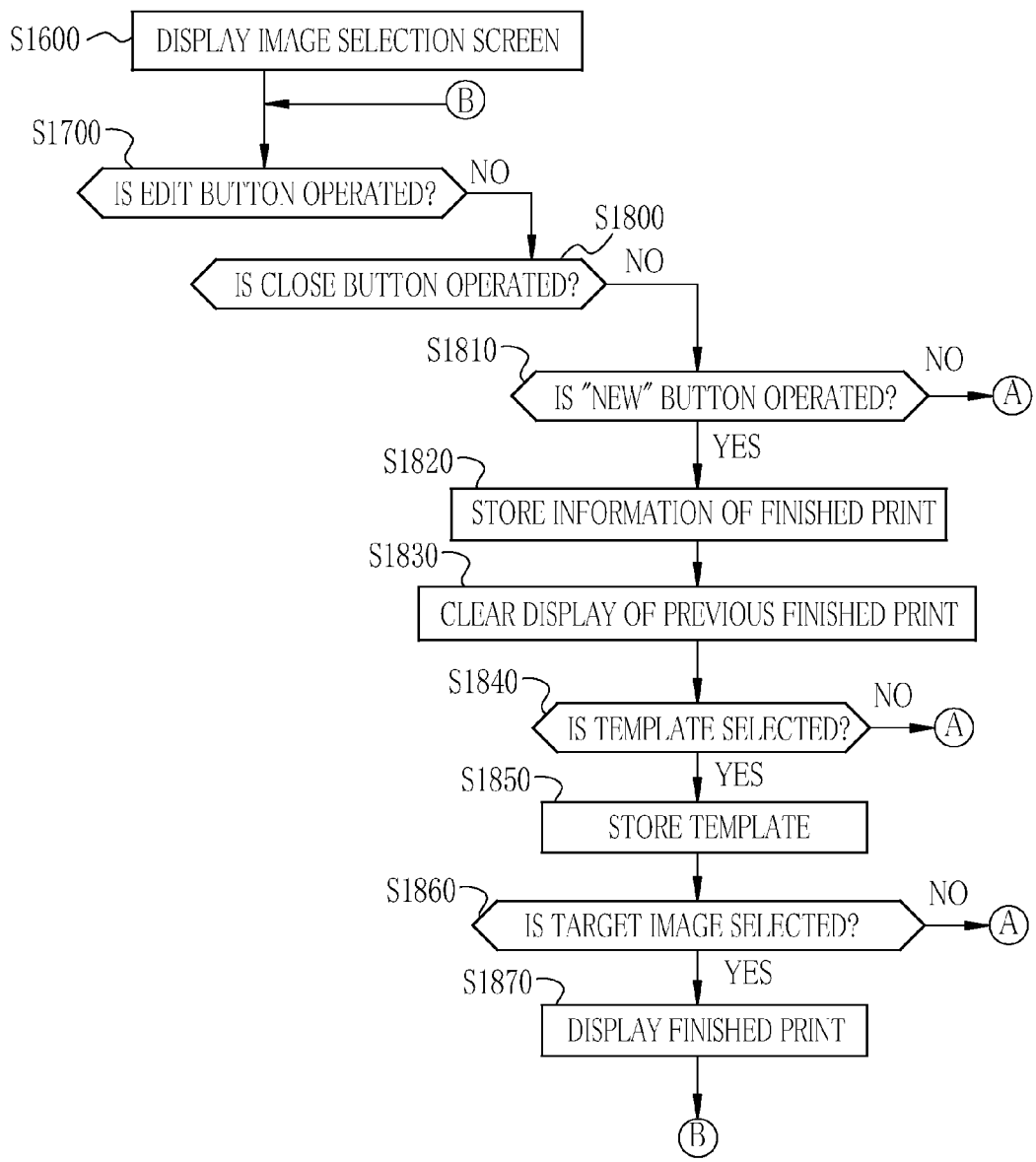
FIG. 12 is a flow chart of a procedure for adding a print of FIG. 10.

FIG. 12 shows a procedure for adding the finished print. Upon touching the "NEW" button 74 in the image selection screen 70 (i.e., YES in step S1810), the information of the finished print 73 currently displayed in the finished print display area 75 is stored in the template storage 82 (step S1820). Thereafter, the display content of the finished print 73 selected the previous time is cleared (step S1830). Specifically, another template 72 is newly displayed in the finished print display area 75, and the highlighted state of the target images 47 selected the previous time is canceled in the list display area 46, for example, such that the preparation for receiving selection of other thumbnail images 44 is completed. Note that, in FIG. 12, the same processing as that in FIG. 6 is denoted by the same reference numeral, and the explanation thereof will be omitted.

Figure 13:
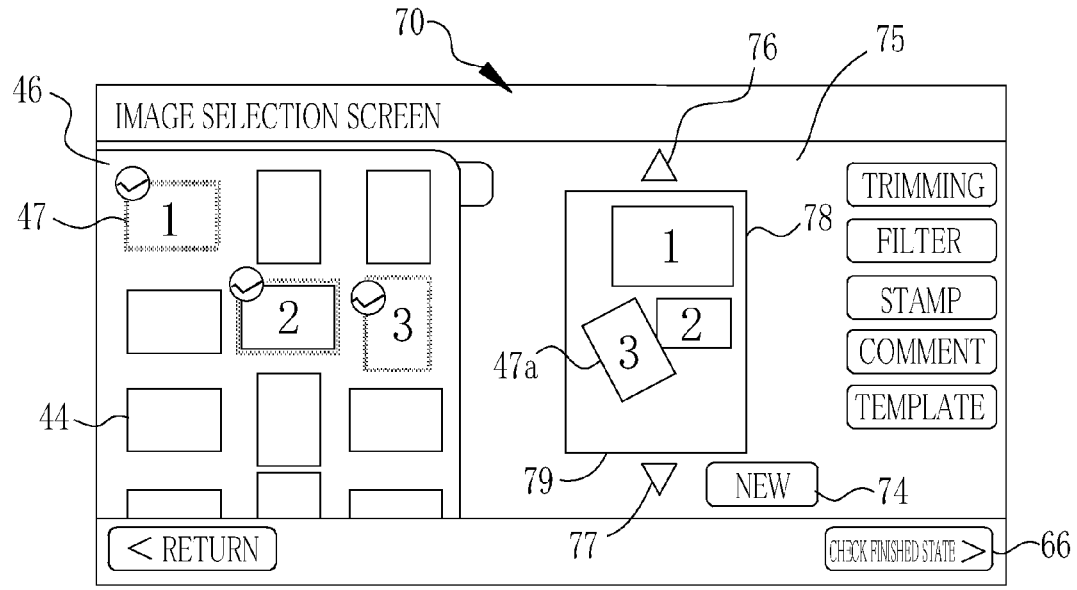
FIG. 13 is an explanatory view of an image selection screen provided with the order addition function.

FIG. 13 shows the image selection screen 70 in which a second finished print 78 is displayed. The image selection screen generator 34 displays the triangular button 76 at the upper portion of the finished print display area 75, and the triangular button 77 at the lower portion thereof, so as to generate the finished print display area 75 capable of being scrolled in a direction indicated by the triangular buttons 76 and 77, for example, in a vertical direction. Upon scrolling the finished print display area 75 in the direction indicated by the triangular buttons 76 and 77, the template selection area generator 83 displays a template 79 different in kind from the currently-displayed template. Upon touching the desired template 79 (i.e., YES in step S1840), the template 79 is registered as the second template 79 (step S1850). Then, upon selection of the target images 47 from among the thumbnail images 44 displayed in the list display image 46 (step S1860), the finished print 78 obtained by combining the print target images 47a, which are the same as the target images 47, with the second template 79 is displayed in the finished print display area 75 (step S1870).

Figure 14:
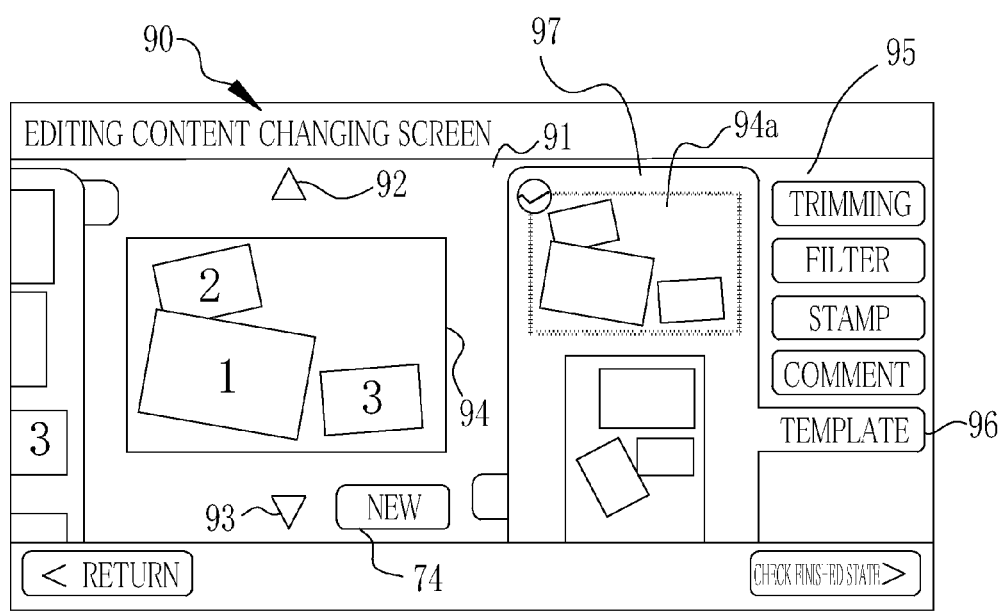
FIG. 14 is an explanatory view of an editing content changing screen provided with the order addition function.

FIG. 14 shows an embodiment in which an editing content changing screen 90 is provided with the order addition function. The editing content changing screen generator 36 displays a triangular button 92 at the upper portion of a finished print display area 91, and a triangular button 93 at the lower portion thereof, so as to generate the finished print display area 91 capable of being scrolled in a direction indicated by the triangular buttons 92 and 93, for example, in a vertical direction. When the finished print display area 91 is scrolled in the direction indicated by the triangular buttons 92 and 93, the template selection area generator 83 displays a template 94 different in kind from the currently-displayed template in the finished print display area 91. Upon touching the desired template 94, the CPU 18 receives the template 94 as a newly-added print.

Figure 15:
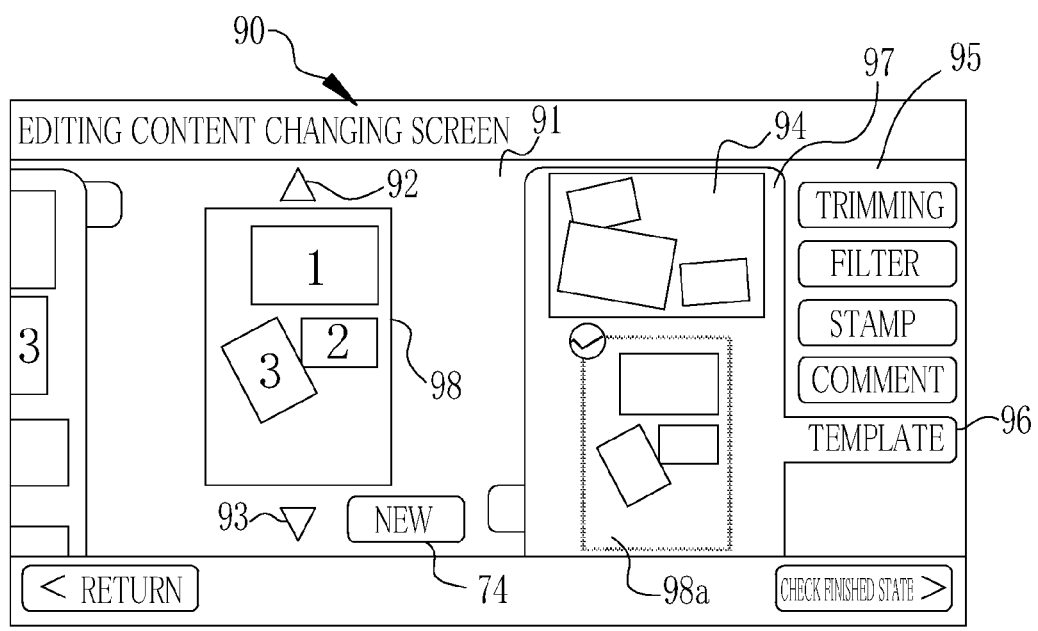
FIG. 15 is an explanatory view illustrating the editing content changing screen after an order is added.

FIG. 15 shows a state in which a second template 98 is selected. The editing content changing screen generator 36 displays an edit button 96 indicating a command "template", for example, in an editing command display area 95. Upon touching the edit button 96 indicating the command "template", a template 98a different in kind from the currently-displayed template is displayed in a balloon display area 97. The balloon display area 97 is generated as a screen capable of being scrolled. The template selection area generator 83 displays the template 98a different in kind from the currently-displayed template in the finished print display area 91 or the balloon display area 97 in accordance with the scrolling operation. Upon selection of the desired template 98a as the second template from the template 94 and the template 98a displayed in the finished print display area 91 or the balloon display area 97, the template 94 displayed in the finished print display area 91 is switched to the second template 98. Then, upon touching the "NEW" button 74, the CPU 18 receives the second template 98 as a newly-added print. As described above, in the embodiments shown in FIGS. 14 and 15, the template can be selected in both the finished print display area 91 and the balloon display area 97.

Since the template selection area generator 83 for displaying different kinds of templates is provided in each of the embodiments shown in FIGS. 10 to 15, an operation for returning to the previous screen to select a template and other operations are unnecessary in order to make an additional order or switch the templates only. As a result, the speeding-up of the operation can be achieved.

Although the list display area, the finished print display area, and the editing command display area are slid from side to side (i.e., in the horizontal direction) in each of the above embodiments, each of the areas may be slid in the vertical direction or along a diagonal line of the screen.

Although the print order reception apparatus disposed at a shop is explained in each of the above embodiments, the present invention is not limited thereto. The present invention is also applicable to an image processing device and an image processing program to be used in an information terminal having a telephone function, and various devices such as PHS (Personal Handy-phone System), PDA (Personal Digital Assistance), a portable navigation device, a personal computer, and a game machine.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image processing device comprising:
    a processor configured to generate a first screen in which a list display area and a finished print display area are displayed side by side, the list display area displaying a plurality of inputted images, and the finished print display area displaying target images selected in the list display area in a finished state in which the target images are combined with a template defining positions for arranging the target images;
    a processor configured to generate a second screen in which the finished print display area and an editing command display area for displaying an editing command to edit the target images are displayed side by side; and
    a processor configured to select one of the first screen and the second screen, wherein
    the first screen or the second screen is displayed on a display section, wherein
    the finished print display area in the second screen is larger than the finished print display area in the first screen, wherein
    the editing command edits the target images and display edited target images on the second screen, wherein
    edited target images displayed on the second screen are outputted to a printer for printing.

2. The image processing device according to claim 1, further comprising a processor configured to generate a template selection area for displaying different kinds of templates in the finished print display area, each of the templates defining positions for arranging the target images, wherein
    the target images are combined with the template and the target images combined with the template are displayed in the finished print display area.

3. The image processing device according to claim 1, further comprising a processor configured to generate a third screen in which the finished print display area, a balloon display area, and the editing command display area are displayed side by side, the balloon display area displaying items contained in a lower hierarchical level of a designated editing command within a balloon, wherein
    one of the first screen, the second screen, and the third screen is selected.

4. The image processing device according to claim 3, wherein the finished print display area in the second screen is larger than the finished print display area in the third screen.

5. The image processing device according to claim 3, wherein the processor configured to select comprises:
    a first operation section displayed in the second screen and the third screen so as to select the first screen;
    a second operation section displayed in the first screen so as to select the second screen;
    a third operation section displayed in the second screen so as to select the third screen; and
    a fourth operation section displayed in the third screen so as to select the second screen.

6. The image processing device according to claim 3, further comprising a processor configured to generate a template selection area for displaying different kinds of templates in the finished print display area, each of the templates defining positions for arranging the target images, wherein
    the target images are combined with the template and the target images combined with the template are displayed in the finished print display area.

7. The image processing device according to claim 1, further comprising a processor configured to make an order for printing the target images displayed in a finished state in the finished print display area.

8. The image processing device according to claim 1, wherein relative positions, sizes and ranges of the target images displayed in the finished state are the same as those of an image obtained by printing the target images combined with the template.

9. The image processing device according to claim 1, further comprising a central processing unit, a read only memory, and a random access memory.

10. The image processing device according to claim 1, further comprising a touch sensor and a display panel.

11. An image processing method comprising:
    a first screen generating step for generating a first screen in which a list display area and a finished print display area are displayed side by side, the list display area displaying a plurality of inputted images, and the finished print display area displaying target images selected in the list display area in a finished state in which the target images are combined with a template defining positions for arranging the target images;
    a second screen generating step for generating a second screen in which the finished print display area and an editing command display area for displaying an editing command to edit the target images are displayed side by side;
    a selection step for selecting one of the first screen and the second screen; and
    a displaying step for displaying the first screen or the second screen selected by the selection step, wherein
    the finished print display area in the second screen is larger than the finished print display area in the first screen, wherein the editing command edits the target images and display edited target images on the second screen, wherein edited target images displayed on the second screen are outputted to a printer for printing.

12. The image processing method according to claim 11, further comprising a third screen generating step for generating a third screen in which the finished print display area, a balloon display area, and the editing command display area are displayed side by side, the balloon display area displaying items contained in a lower hierarchical level of a designated editing command within a balloon, wherein the selection step selects one of the first screen, the second screen, and the third screen.

13. The image processing method according to claim 11, wherein relative positions, sizes and ranges of the target images displayed in the finished state are the same as those of an image obtained by printing the target images combined with the template.

14. A non-transitory tangible storage medium storing an image processing program for making a computer execute the following steps in a computer-readable manner:

a first screen generating step for generating a first screen in which a list display area and a finished print display area are displayed side by side, the list display area displaying a plurality of inputted images, and the finished print display area displaying target images selected in the list display area in a finished state in which the target images are combined with a template defining positions for arranging the target images;

a second screen generating step for generating a second screen in which the finished print display area and an editing command display area for displaying an editing command to edit the target images are displayed side by side;

a selection step for selecting one of the first screen and the second screen; and a displaying step for displaying the first screen or the second screen selected by the selection step, wherein the finished print display area in the second screen is larger than the finished print display area in the first screen, wherein the editing command edits the target images and display edited target images on the second screen, wherein edited target images displayed on the second screen are outputted to a printer for printing.

15. The storage medium according to claim 14, wherein the image processing program further makes the computer execute a third screen generating step for generating a third screen in which the finished print display area, a balloon display area, and the editing command display area are displayed side by side, the balloon display area displaying items contained in a lower hierarchical level of a designated editing command within a balloon, wherein the selection step selects one of the first screen, the second screen, and the third screen.

16. The storage medium according to claim 14, wherein relative positions, sizes and ranges of the target images displayed in the finished state are the same as those of an image obtained by printing the target images combined with the template.

* * * * *